United States Patent [19]

Jackson et al.

[11] Patent Number: 4,759,810
[45] Date of Patent: Jul. 26, 1988

[54] METHOD AND APPARATUS FOR APPLYING A GASKET TO AN OBJECT

[75] Inventors: Christopher J. Jackson, Toledo; Mark H. Brosman, Northwood, both of Ohio

[73] Assignee: Libbey-Owens-Ford Co., Toledo, Ohio

[21] Appl. No.: 44,828

[22] Filed: May 1, 1987

[51] Int. Cl.⁴ .............................................. B31C 13/00
[52] U.S. Cl. ..................................... 156/64; 156/350; 156/391; 156/574; 156/577; 156/584; 242/682; 242/74
[58] Field of Search .................. 156/391, 350, 64, 367, 156/574, 577, 523, 584, 540, 522; 242/74, 72 (B), 68.2, 68.3, 68.4

[56] References Cited

U.S. PATENT DOCUMENTS

| | | | |
|---|---|---|---|
| 3,673,044 | 6/1972 | Miller et al. | 156/391 X |
| 3,704,837 | 12/1972 | Heinz et al. | 242/68.2 |
| 4,285,752 | 8/1981 | Higgins | 156/522 |
| 4,328,061 | 5/1982 | Off et al. | 156/584 |
| 4,512,837 | 4/1985 | Sarh et al. | 156/389 |
| 4,605,179 | 8/1986 | Arbter | 242/74 X |

Primary Examiner—David Simmons
Attorney, Agent, or Firm—Marshall & Melhorn

[57] ABSTRACT

A method of applying a double sided adhesively coated foam strip with paper backing as a gasket to a window includes winding a predetermined length on a hollow core, gripping the hollow core with a dispensing cartridge and engaging the dispensing cartridge with a carrier mounted on the end of a robot arm. The carrier includes a gear motor for driving a paper take-up wheel in the cartridge thereby separating the backing paper from the foam strip as the foam strip is applied to the window surface. The cartridge includes a pair of seal guide wheels and a pressure wheel for guiding the tape onto the surface of the window. The carrier further includes means for selectively moving a pair of gripper arms into and out of engagement with the cartridge, a gear motor for driving the paper wrap-up wheel, photocells for sensing the presence of the cartridge and microswitches for sensing engagement of the gripper arms with the cartridge from to stop the movement of the gripper arms.

27 Claims, 8 Drawing Sheets

METHOD AND APPARATUS FOR APPLYING A GASKET TO AN OBJECT

BACKGROUND OF THE INVENTION

The present invention relates to a method and apparatus for applying a gasket to a surface of an object and, in particular, to a method and apparatus for applying an adhesively backed foam tape strip to a window assembly.

In many automotive applications, it is desirable to apply a strip of gasket material to the surface of a part before the part is installed on a vehicle body. For example, it is desirable to apply a strip of foam gasket material about the periphery of a window assembly to provide a seal and a resilent mounting surface when the window assembly is attached to a corresponding vehicle body. According to one known method, an adhesive was applied to the foam strip just before the strip was applied to the window assembly. According to another known method, an adhesive substance was applied to the foam strip when it was manufactured and the adhesive surface was protected by paper which could be removed at the time of assembly. In either case, the assembly operation was costly in terms of the time required and the potential for error by a human operator applying the tape along a predetermined path by hand. If an error were made, often times the adhesive properties would be degraded or the tape physically torn during an attempt to free the tape from the window assembly surface and reposition it.

The present invention overcomes these prior art problems by mechanically applying the tape such that the same pattern is always achieved.

SUMMARY OF THE INVENTION

The present invention concerns a method and an apparatus for automatically applying an adhesively backed foam strip tape to the surface of a vehicle window assembly along a predetermined path. An operator loads rolls of the tape which have been precut and wound in a spiral pattern on a core into a first work station. The roll of tape is mounted in a cartridge which is then moved to a second work station. A gripper assembly mounted on the end of a robot arm engages the cartridge and the robot moves the arm and gripper assembly adjacent to a turntable.

Window assemblies are loaded at a first station of the turntable which advances to the second turntable station where the robot arm and gripper is then controlled to apply the tape from the cartridge to the surface of the window assembly in a predetermined pattern. The turntable then advances to a third station when an operator trims any overlap and inserts plastic spacers into holes in the window assembly. Finally, the turntable advances to a fourth station where the window assembly and attached gasket are taken off of the turntable and stacked for shipment.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
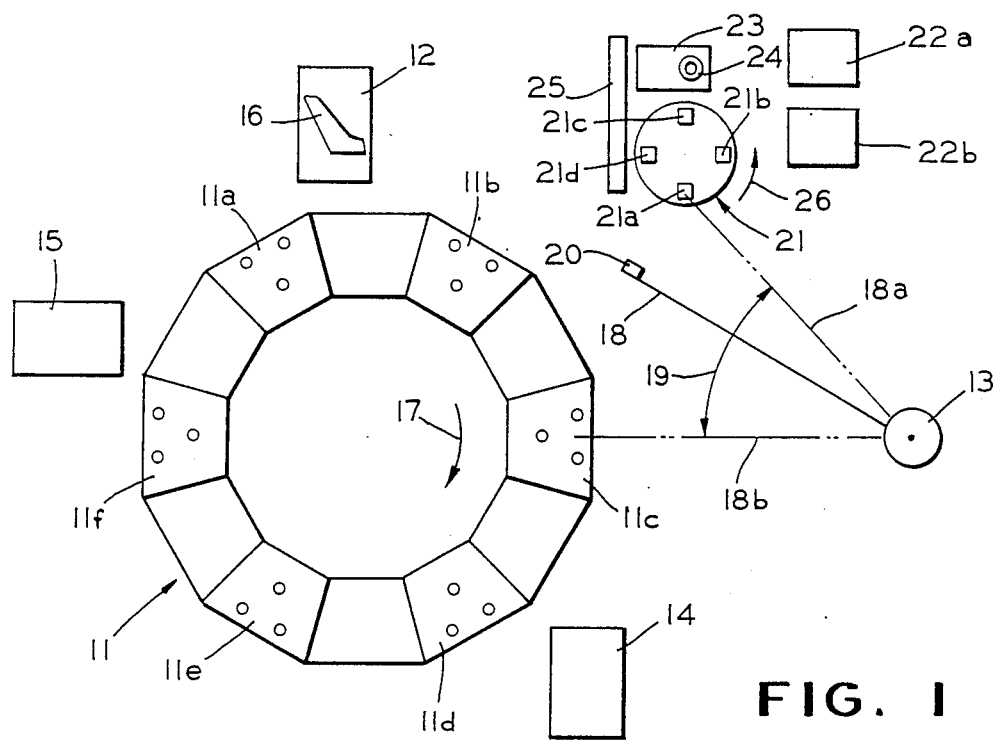
FIG. 1 is a schematic plan view of an apparatus for applying gaskets to window assemblies incorporating the present invention.

An apparatus for applying an adhesively backed foam tape strip to an automotive window assembly, in accordance with the method and apparatus of the present invention, is shown schematically in FIG. 1. A carousel or a turntable indexing system 11 is utilized to move a workpiece between work stations. The turntable 11 is shown as being formed of twelve segments, six of which, 11a through 11f, are equipped with fixtures for supporting workpieces. However, the turntable 11 need only have as many segments as there are work stations and could have many more segments thereby permitting multiple sets of work stations to be positioned about the turntable.

A workpiece loading station 12 is shown as being positioned adjacent the segment 11a of the turntable 11. A robot 13 is positioned adjacent the segment 11c, a trimming/inserting station 14 is positioned adjacent the segment 11d, and an unloading station 15 is positioned adjacent the segment 11f. Thus, only four of the segments are located at a work station as the turntable 11 indexes workpieces from station to station.

A workpiece such as window assembly 16 is initially placed at the loading station 12. A human operator places the workpiece 16 onto a fixture associated with the segment 11a and applies a primer to the upwardly facing surface. When the turntable 11 is rotated in the direction of an arrow 17, and the segment 11a is located at the position of the segment 11c shown in FIG. 1, the robot 13 is actuated to apply a predetermined length of adhesively backed foamed tape to the upwardly facing surface of the window assembly 16. The robot 13 includes a radially extending arm 18 which can be rotated between a tape loading position 18a shown in phantom and a tape dispensing position 18b shown in phantom along a path defined by an arrow 19. As will be discussed below, the arm 18 has a tape cartridge carrier 20 attached to its outer end which carrier is located above the turntable 11 and any workpiece 16 thereon in the position 18b.

The segment 11a is next rotated to the position occupied by the segment 11d in FIG. 1. An operator trims the ends of the foam strip if required and applies a sealant to them, and performs other operations such as inserting plastic spacers into holes formed in the window assembly. When the segment 11a has rotated to the location of the segment 11f shown in FIG. 1, a human operator removes the window assembly 16 from the turntable 11 and typically applies a piece of shipping paper before stacking the window assembly for transfer to a shipping area. The segment 11a is then rotated to its original position shown in FIG. 1 where another window assembly 16 is placed on the supporting fixture. Thus, although six window assemblies are located on the turntable 11 at any one time, only four of the window assemblies are positioned at work stations.

When the robot arm 18 is in the position 18a, the tape cartridge carrier 20 is adjacent a holder 21a of a four station turntable 21. Typically, the adhesively backed foam tape strips are cut to a predetermined length and wound onto a cardboard core to form a spiral assembly. A plurality of these tapes are then stored at a tape load station 22a adjacent the turntable 21. An operator loads one tape at a time onto a fixture 23. For example, as will be discussed below, a tape 24 is rotated into engagement with a horizontal slide 25 which accepts the tape and moves it adjacent the turntable 21 at a cartridge load station for a holder 21d. At the cartridge load station, the tape is loaded into a cartridge removably mounted on the upstanding holder 21d. When the robot arm 18 has moved to the position 18a from the position 18b, it disengages from the empty cartridge held by the carrier 20, which cartridge is accepted on the holder 21a. The turntable 21 is rotated in the direction of an arrow 26 to move the holder 21d to the position occupied by the holder 21a in FIG. 1 at a cartridge engage/disengage station. The carrier 20 then engages the loaded cartridge and removes it from the holder 21d to repeat the robot cycle.

At the same time, the holder 21a has moved to the position of a holder 21b shown in FIG. 1 adjacent a tape unload station 22b. The tape typically includes a paper strip covering adhesive on the surface to be applied to the workpiece. As will be described below, this paper is removed and wound onto the cartridge in position 18b of the robot arm 18. At the station 22b, this paper is removed from the cartridge which is then ready to be reloaded. A fourth holder 21c is shown in FIG. 1 at an unused station.

Figure 2:
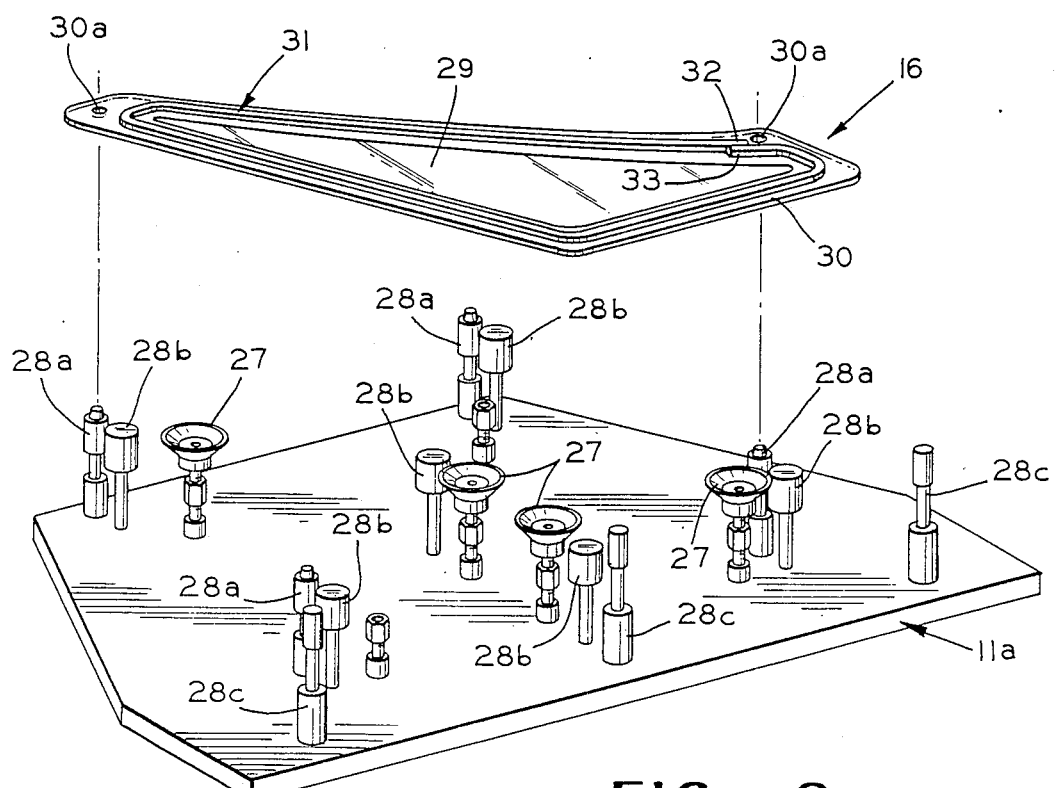
FIG. 2 is a perspective view of a turntable section and completed window assembly of FIG. 1.

There is shown in FIG. 2 a perspective exploded view of the turntable segment 11a and the window assembly 16. The turntable segment 11a is representative of segments 11b through 11f and includes a plurality of vacuum cups 27 and stationary locator pins 28a for supporting and retaining the window assembly 16. The window assembly 16 rests upon an upper surface of a plurality of support pins 28b. A plurality of bumper pins 28c extend above the upper surface of the support pins 28b to assist in locating an edge of the window assembly 16. The locator pins 28a engage apertures in the window assembly and the vacuum cups 27 are actuated to attach to a downwardly facing surface and firmly hold the window assembly 16 during the operations in the work cycle.

The segment 11a can be adapted to accept both right hand and left hand window assemblies, if required, wherein one or more of the vacuum cups 27 are movable on the surface of the segment 11a so as to form a mirror image support. The window assembly 16 includes a central transparent portion 29 surrounded by an opaque peripheral portion 30. A pair of apertures 30a are formed in the portion 30 and accept corresponding ones of the locator pins 28a.

In order to seal the window assembly 16 into a corresponding opening in a vehicle body, a gasket 31 is utilized. Typically, the gasket 31 is of square or rectangular cross-section and is formed of a foam material which is resilient. The gasket has an adhesive substance applied to at least the surface facing the adjacent surface of the peripheral portion 30 of the window assembly 16. Typically, the gasket material is shipped in long strips wound in a coil with the adhesive protected by a removable paper (not shown). The paper must be removed before the adhesively coated surface is pressed against the abutting surface of the window assembly 16. Furthermore, the gasket 31 has a pair of ends 32 and 33 which are located adjacent one another as the gasket strip follows a predetermined path about the periphery 30.

Figure 3:
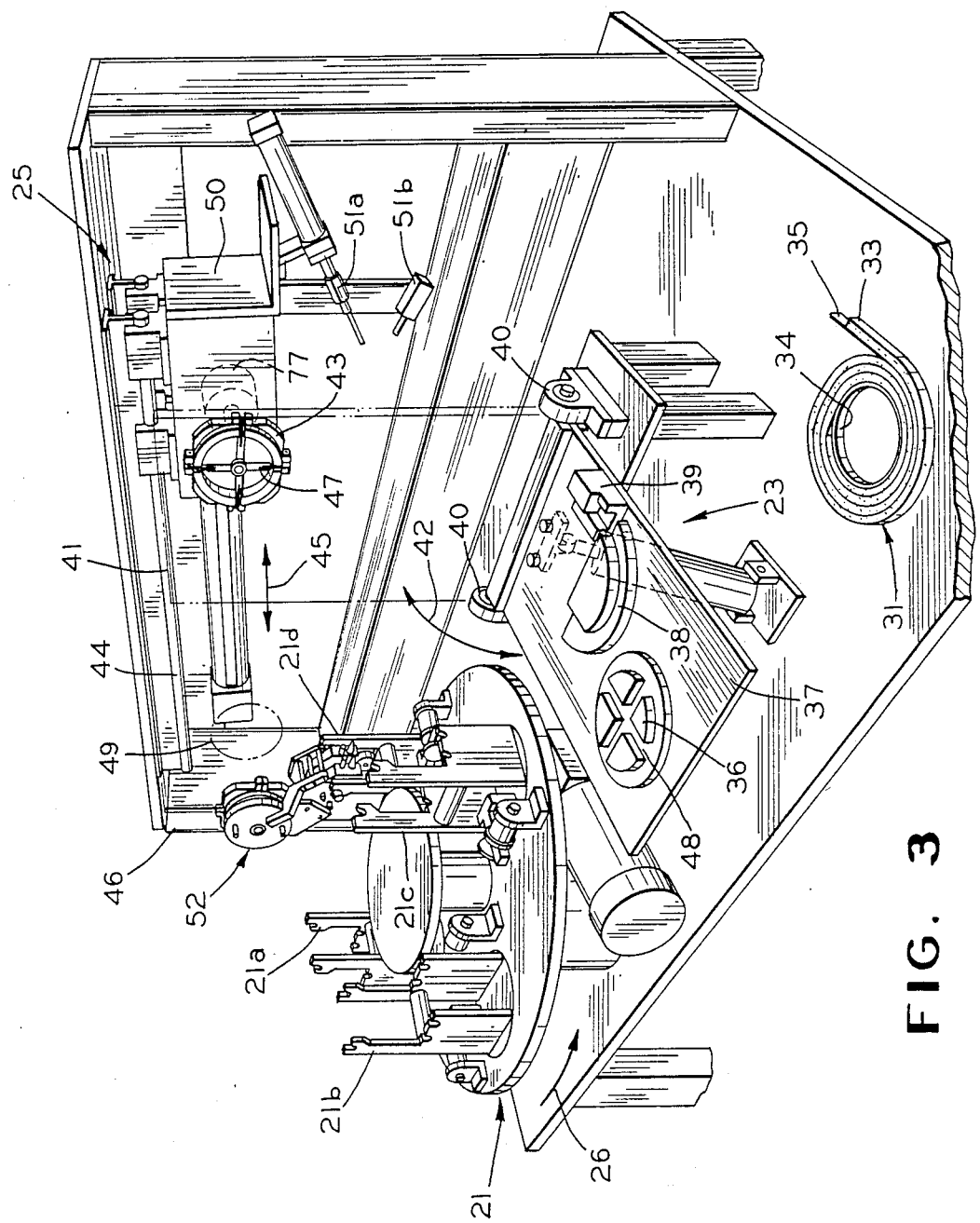
FIG. 3 is a perspective view of the tape loading and cartridge loading stations of the apparatus according to FIG. 1.

There is shown in FIG. 3 the fixture 23, the horizontal slide 25 and the turntable 21 for loading the predetermined lengths of gasket material into cartridges for application to the window assembly 16 by the robot 13. A predetermined length of foam strip gasket 31 is wound about the outer surface of a cardboard core 34. The strip end 33 is shown as being free and the backing paper with a leader 35 extends beyond the end 33. During assembly, an operator removes a gasket 31 and associated cardboard core 34 from the tape load station 22a and places it on a mandrel 36 attached to a base plate 37 of the fixture 23. The end 33 of the gasket 31 is unwound and positioned around a guide block 38 before being secured in a holder block 39. The guide block 38 and the holder block 39 are attached to the surface of the base plate 37 adjacent the mandrel 36. The edge of the base plate 37 closest to the horizontal slide 25 is pivotally mounted in a pair of bearings 40 for movement between the horizontal position shown and a substantially vertical position 41, shown in phantom lines, along a path indicated by an arrow 42. In the vertical position 41, the mandrel 36 is positioned adjacent an expanding mandrel 43 which is mounted for generally horizontal movement along a track 44 as indicated by an arrow 45. The track 44 is supported in a frame 46 of the horizontal slide 25.

The mandrel 43 includes four equally spaced extendable and retractable fingers 47 which fingers are radially movable in a plurality of corresponding slots 48 formed in the mandrel 36. Thus, the fingers 47 are retracted until the mandrel 36 is rotated into position adjacent the mandrel 43. The fingers 47 are then radially extended to engage the inner surface of the cardboard core 34. Thus, when the fixture 23 is rotated back to the position shown in FIG. 3, the gasket 31 and core 34 are firmly held on the mandrel 43. Next, the mandrel 43 is moved along the track 44 to a cartridge load station position 49 shown in phantom adjacent the turntable 21. The mandrel 43 is mounted on a bracket 50 which in turn is slidably mounted on the track 44. Also attached to the bracket 50 are a pair of actuators 51a and 51b for grasping the gasket 31 and the leader 35 and removing them from the holder block 39 when the fixture 23 is in the position 41.

Adjacent the position 49 for the mandrel 43 is one of the holders of the turntable 21 such as the holder 21d. Each of the stations of the turntable 21 includes a holder for supporting and positioning a tape cartridge 52. The tape 31 and core 34 are transferred from the mandrel 43 to the tape cartridge 52 and are held in position by the tape cartridge 52 as will be described below. The turntable is then rotated or indexed such that the holder 21d is moved to the position occupied by the holder 21a. The holder 21d is also rotated ninety degrees with respect to the turntable to the orientation shown in FIG. 3 for the holder 21a. The tape cartridge 52 is then ready to be gripped by the tape cartridge carrier 20 on the end of the robot arm 18. At the same time, the carrier 20 has disengaged from another cartridge 52 (not shown) in the holder 21a and the holder 21a is rotated ninety degrees with respect to the turntable to the orientation shown in FIG. 3 for the holder 21b.

Figure 4:
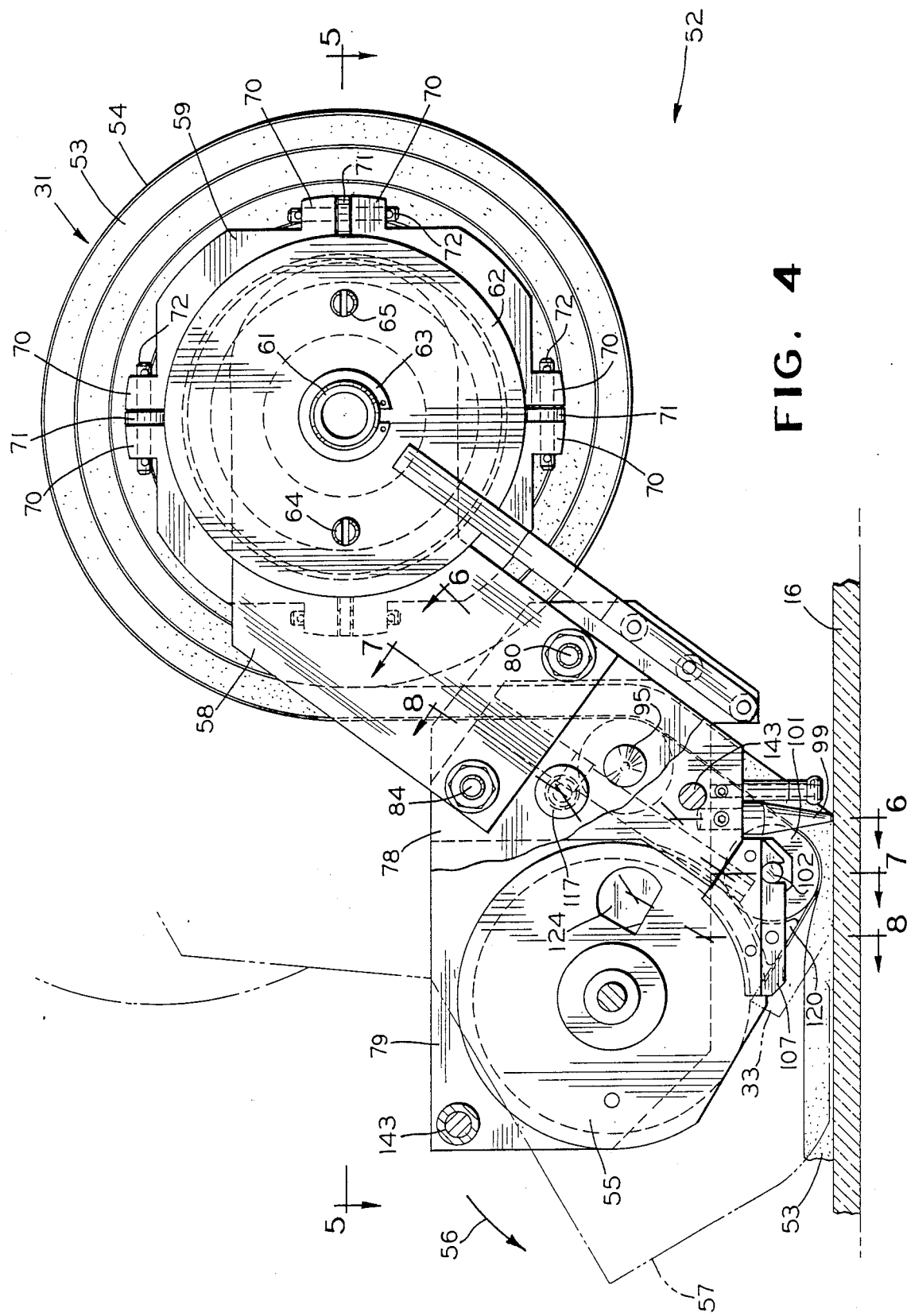
FIG. 4 is an enlarged elevational view of the tape cartridge shown in FIG. 3.

There is shown in FIG. 4 an enlarged view of the tape cartridge 52 loaded with the gasket 31 comprising a strip 53 of foam tape and a strip 54 of backing paper. The cartridge 52 is shown in position for applying the tape 53 to an upwardly facing surface of the workpiece 16. The tape 53 has an adhesive material applied to opposite surfaces. As the tape is unwound, one of the adhesive bearing surfaces is pressed against the upwardly facing surface of the workpiece 16. The opposite adhesive bearing surface carries the paper tape 54 which is striped away from the foam tape 53 and wound on a paper take-up wheel 55.

When the tape cartridge 52 is initially positioned near the workpiece 16, the end 33 of the foam tape 53 is oriented in the position shown in phantom line. In order to start the tape properly, the entire tape cartridge 52 is rotated by the robot in the direction of an arrow 56 to the position shown in phantom outline 57. In the position 57, the end 33 of the tape 53 is firmly pressed against the upper surface of the workpiece 16 to adhesively secure it in place. When the tape cartridge 52 is rotated back to the position shown in solid line, the end 33 of the tape 53 pulls away from the leader 35 (not shown) of the backing paper 54 which is secured to the wheel 55. As the tape cartridge 52 is moved along a predetermined path above the upper surface of the workpiece 16, the foam tape 53 is applied to the workpiece 16 and the wheel 55 is rotated to accumulate the backing paper 54.

Figure 5:
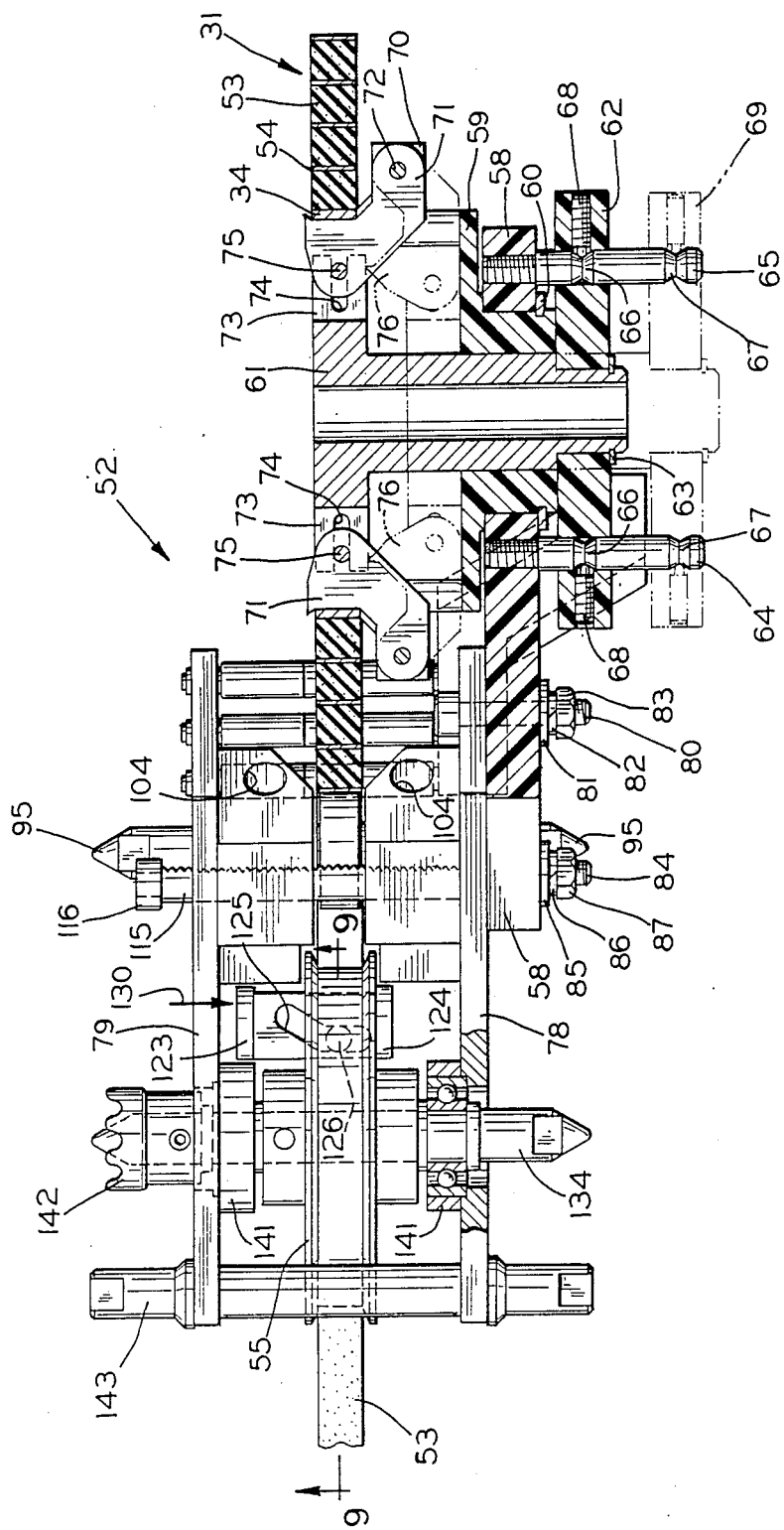
FIG. 5 is cross-sectional view of the tape cartridge taken along the line 5—5 in FIG. 4.

Referring to FIGS. 4 and 5, the tape cartridge 52 includes a generally planar tape roll mounting bracket 58 extending in a plane generally perpendicular to the plane of the workpiece 16. Extending through an aperture formed in the mounting bracket 58 is a hub portion of a tape roll housing 59. The hub portion is secured in the aperture with a radially extending flange at one end and a retaining ring 60 at the opposite end. The hub portion of the tape roll housing 59 also has an aperture formed therein through which extends a tubular body of a tape roll gripper actuator 61. One end of the tubular body is reduced in diameter and extends through a central aperture of a tape roll housing 62. The housing 62 is secured to the tape roll gripper actuator 61 with a retaining ring 63.

A pair of tape roll guide pins 64 and 65 are threadably retained in the tape roll mounting bracket 58 and extend through corresponding apertures formed in the tape roll housing 62. Each of the pins 64 and 65 has a pair of spaced apart circumferential grooves 66 and 67 formed therein. A pair of spring loaded detents 68 are threadably retained in the tape roll housing 62 and radially extend into engagement with the grooves 66. The detents 68 also cooperate with the grooves 67 for retaining the tape roll gripper actuator 61 and the tape roll housing 62 in an alternate position 69 shown in phantom in FIG. 5.

The flanged end of the tape roll gripper housing 59 includes an axially extending annular flange which is separated into four spaced apart segments. The ends of adjacent segments define four pairs of spaced apart generally radially extending flanges 70. A tape roll gripper dog 71 is rotatably retained between each pair of the flanges 70 by a gripper dog pin 72 which is secured at opposite ends to the flanges 70. The end of the tape roll gripper actuator 61 opposite the end attached to the tape roll housing 62 is enlarged in diameter and includes four pairs of generally radially extending spaced apart flanges 73. Each of the flanges 73 has an open ended slot 74 formed therein for slidably retaining a gripper dog guide pin 75. Whereas one end of each gripper dog 71 is rotatably retained by a gripper dog pin 72, the opposite end is secured to an associated one of the gripper dog guide pins 75.

The outer diameter of the flanges 73 is less than the inner diameter of the annular segments formed on the gripper housing 71. Thus, when the tape roll gripper actuator 61 and the tape roll housing 62 are retracted to the position 69, the tape roll gripper dogs 71 are rotated to a position 76 shown in phantom which is a disengaged position. The tape roll gripper actuator 61 is actuated between the two positions by a pneumatic cylinder 77 associated with the expanding mandrel 43 as shown in FIG. 3. The gripper dogs 71 are held in the position 76 until the mandrel 43 has been moved adjacent the flanged end of the gripper housing 59. Then the actuator 61 is moved to the position shown in solid lines thereby rotating the gripper dogs 71 into engagement with an inner circumferential surface of the cardboard core 34 thereby retaining the gasket 31 on the tape roll gripper actuator 61. When the tape cartridge 52 is returned to the holder after the gasket has been applied to the window assembly, the actuator 61 is again moved to the position shown in phantom to release the cardboard core 34 in the position of the unload station 22b.

The tape roll mounting bracket 58 is attached to an outwardly facing surface of a left frame half 78 which in turn is attached to a spaced apart, generally parallelly extending right frame half 79. The bracket 58 and the frame 78 are connected with a bolt 80 having its head abutting an inwardly facing surface of the frame 78 and a shank extending through apertures formed in the frame 78 and the bracket 58. The shank of the bolt 80 extends beyond an outwardly facing surface of the bracket 58 through a flat washer 81 and a lock washer 82 which are retained in an abutting relationship to the bracket 58 by a threadably engaged nut 83. The frame halves 78 and 79 are held in spaced apart relationship by several means which will be discussed in connection with FIGS. 6–8.

Figure 6:
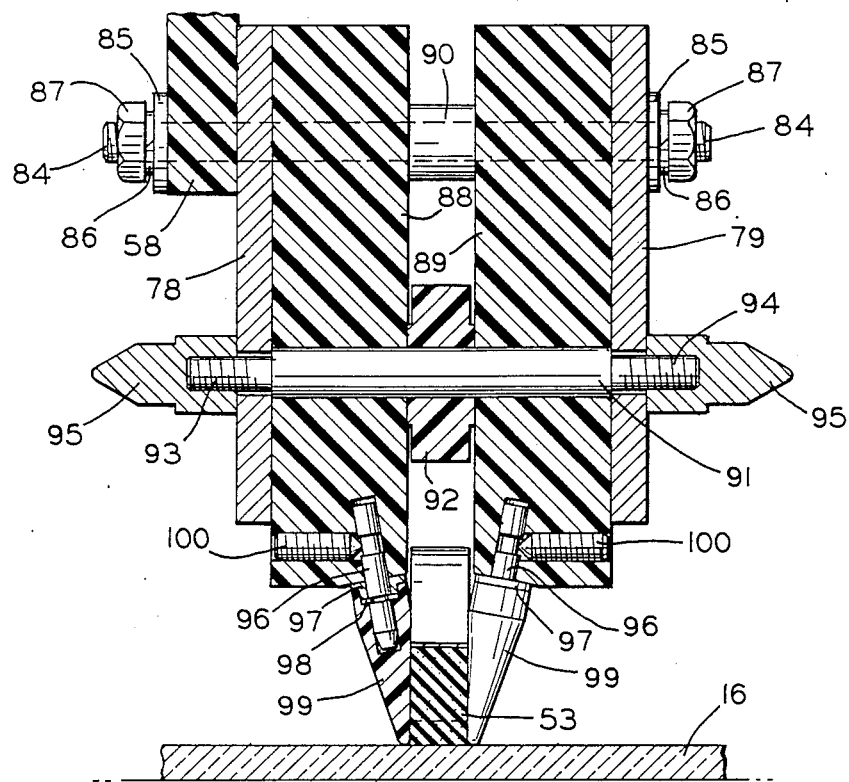
FIG. 6 is a cross-sectional view taken along the line 6—6 in FIG. 4.

Referring to FIG. 6, a tie rod/axle 84 extends through apertures formed in the bracket 58 and the frames 78 and 79 and is threaded at both ends to receive a flat washer 85, a lock washer 86 and a nut 87. In FIG. 5, the end of the tie rod/axle 84, the flat washer 85, the lock washer 86 and the nut 87 have been eliminated to show details which will be described in connection with FIG. 7. Positioned between the frame halves 78 and 79 are a left half pressure wheel housing 88 and a right half pressure wheel housing 89 separated by a spacer 90. The tie rod/axle 84 extends through apertures formed in the housings 88 and 89 and the spacer 90. A tie rod 91 also extends through apertures formed in the pressure wheel housings 88 and 89 and extends through a central aperture formed in an idler wheel 92 which is rotatably retained on the tie rod 91 between the housings 88 and 89. The tie rod 91 has smaller diameter threaded ends 93 and 94 formed thereon which extend through apertures formed in the frame halves 78 and 79 respectively. A shoulder is formed between the larger diameter central portion of the tie rod 91 and each of the threaded ends 93 and 94 and abuts an inwardly facing surface of the frame halves 78 and 79. A locating pin/nut 95 is threadably retained on the threaded end 93 and abuts an outwardly facing surface of the left frame half 78. A similar locating pin/nut 95 threadably engages the threaded end 94 and abuts an outwardly facing surface of the right frame half 79.

A portion of a downwardly facing surface of each of the wheel housings 88 and 89 is angled upwardly toward the idler wheel 92 and has an aperture formed therein for receiving one end of a seal guide wheel shaft 96. Each wheel shaft 96 extends through a shoulder washer 97. The lower end of the shoulder washer abuts a retaining ring 98 and extends into an aperture formed in a seal guide wheel 99 which has a conical exterior shape. After the shoulder washer 97 and the retaining ring 98 have been assembled on the wheel shaft 96, the seal guide wheel 99 is glued to the shoulder washer 97. The assembly is then inserted into the aperture formed in each of the wheel housings 88 and 89 and is retained by a set screw 100 which threadably engages a threaded aperture formed from the outwardly facing surfaces of the housings 88 and 89 to the interior aperture. The seal guide wheels 99 are spaced apart a distance corresponding to the strip of foam tape 53 and engage an upper surface of the workpiece 16 to guide the tape as it is being applied to the workpiece.

Figure 7:
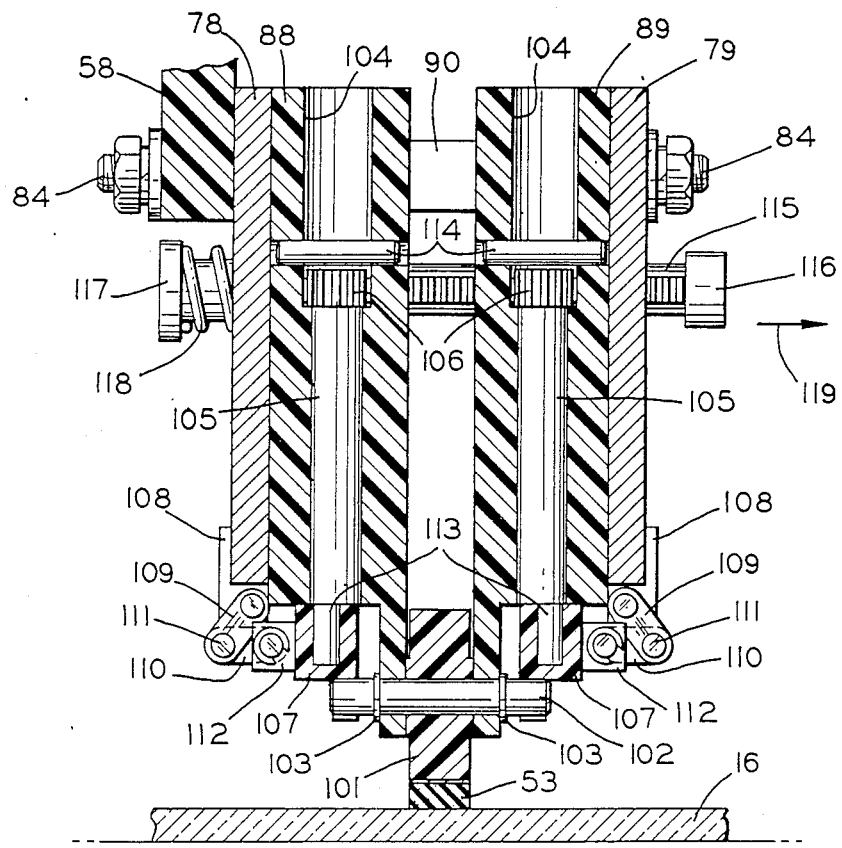
FIG. 7 is a cross-sectional view of the tape cartridge taken along the line 7—7 in FIG. 4.

As shown in FIG. 7, a pressure wheel 101 is rotatably mounted on a pressure wheel shaft 102 which extends through apertures formed in the lower ends of the pressure wheel housings 88 and 89 and is retained therein by retaining rings 103. A pair of generally vertically extending apertures 104 are formed in the wheel housings 88 and 89. Each aperture 104 receives a brake/gripper pinion shaft 105 having a pinion gear 106 formed on an upper end thereof. The lower end of each pinion shaft 105 engages a corresponding one of a pair of brake foam grippers 107. An upper mounting bracket 108 is attached to each of the frame halves 78 and 79 and has one end of a brake link 109 pivotally attached thereto. The other end of each brake link 109 is pivotally attached to a brake link bar 110 by a brake link pivot pin 111. The other end of each brake link bar 110 is pivotally attached to a lower mounting bracket 112 which in turn is attached to the brake/foam gripper 107. The lower end of each of the pinion shafts 105 is attached to the respective gripper 107 by an eccentrically located pin 113. Thus, as the pinion shafts 105 are rotated, the grippers 107 are moved toward and away from the retaining rings 103 on the pressure wheel shaft 102.

Figure 8:
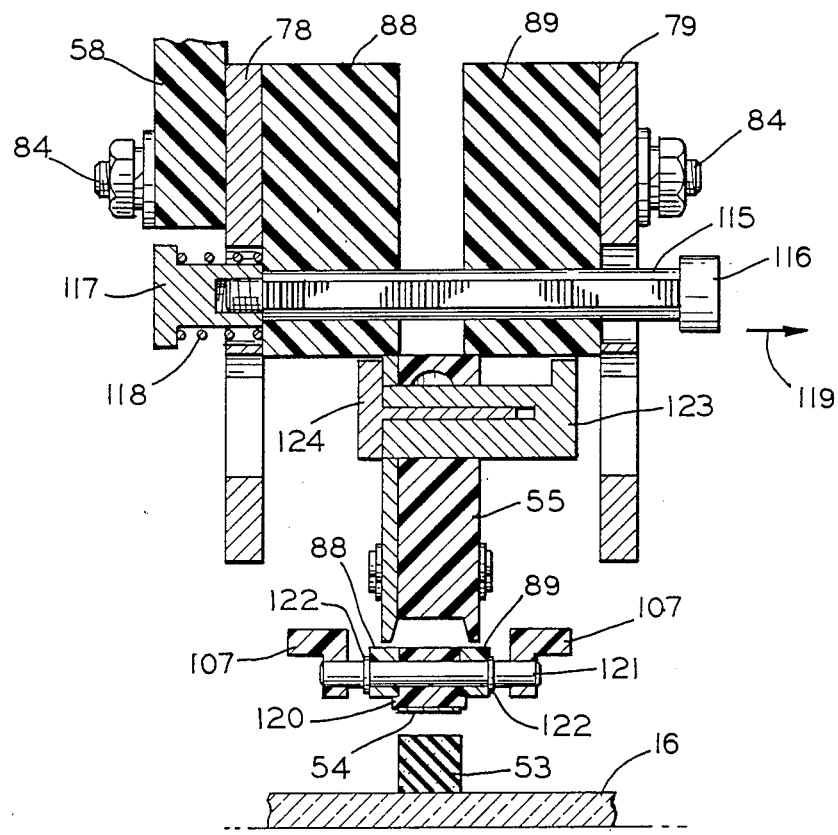
FIG. 8 is a cross-sectional view of the tape cartridge taken along the line 8—8 in FIG. 4.

The pinion shafts 105 are retained in the apertures 104 by pins 114 which extend transversely of the longitudinal axis of each of the apertures 104. Also extending transversely of the longitudinal axes of the apertures 104 is a brake/gripper actuator rack 115. Referring to FIGS. 7 and 8, the rack 115 engages the pinion gears 106 for rotating the pinion shafts 105. The rack 115 extends through the frame halves 78 and 79 and the wheel housings 88 and 89. The end of the rack 15 extending beyond the right frame half 79 threadly engages a brake/gripper actuator cap 116. The opposite end of the rack 115 threadably engages a rack spring cap 117 which has an enlarged head for retaining a helical spring 118 against an outer surface of the wheel housing 88. Force supplied to the rack 115 in the direction of an arrow 119 will move the rack in the direction of the arrow and rotate the pinion shafts 105 to actuate the grippers 107. Release of the force will allow the spring 118 to return the rack 115 to the position shown.

A pressure pad 120 is rotatably attached to a guide shaft 121 which extends through apertures formed in the wheel housings 88 and 89 and apertures formed in the brake/foam grippers 107. A pair of retaining rings 122 are mounted on the guide shaft 121 adjacent the housings 88 and 89. The paper 54 passes over an outwardly facing surface of the pressure pad 120 as it is wrapped upon the paper-wrap wheel 55.

As best shown in FIGS. 5 and 8, a paper gripper actuator 123 extends through an aperture formed in the wheel 55 and is attached to a paper gripper actuator button 124. The actuator 123 has an angled slot 125 formed therein for cooperation with a pin 126 as will be described in connection with FIG. 9.

Figure 9:
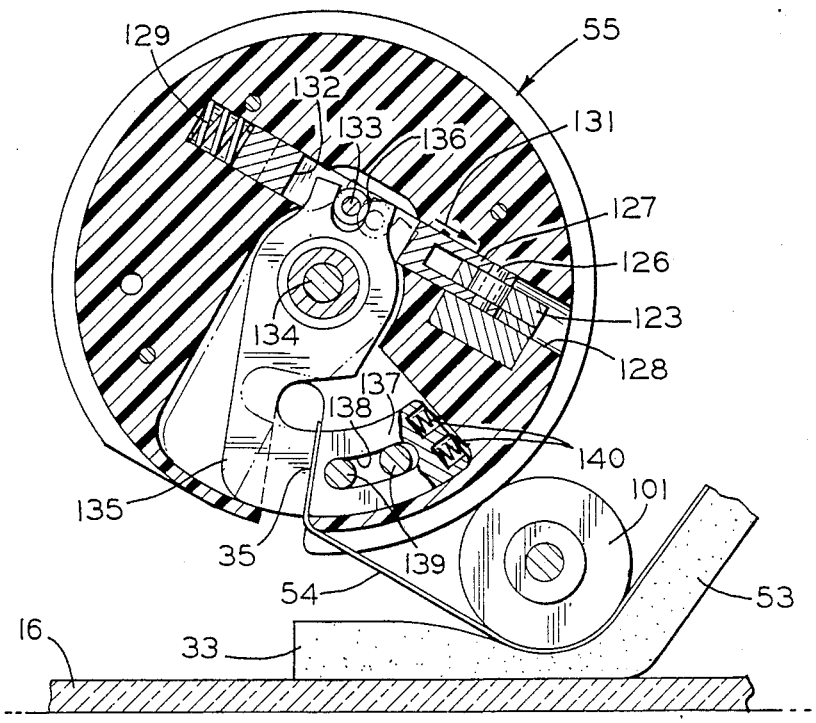
FIG. 9 is a cross-sectional view of the tape cartridge taken along the line 9—9 in FIG. 5.

In FIG. 9, there is shown an interior of the wheel 55 through which the paper gripper actuator 123 extends. The actuator 123 is attached to a paper gripper slide shaft 127 by the pin 126. The slide shaft 127 is retained in an aperture 128 formed in the interior of the wheel 55. The opposite end of the slide shaft 127 abuts a helical spring 129 which is retained in the closed end of the slot 128. When the actuator 123 is moved in the direction of an arrow 130 (FIG. 5), the pin 126 will follow the contour of the slot 125 thereby moving the slide shaft 127 in the direction of an arrow 131 with the assistance of the spring 129. The slide shaft 127 has an aperture 132 formed therein in which is mounted a paper gripper roller 133 having a longitudinal axis extending generally parallel to a drive shaft 134 on which the wheel 55 is mounted. A paper gripper arm 135 is also mounted for rotation on the shaft 134 and has a slot 136 formed in an upper end thereof for engaging the roller 133. Thus, as the slide shaft 127 moves back and forth in the slot 128, the arm 135 will rotate into and out of engagement with the end of the leader 35 of the backing paper 54. The leader 35 is retained by the gripper arm 135 and a paper gripper slide 137. The slide 137 has a central slot 138 formed therein which engages a pair of pins 139 for defining an arcuate path of travel for a relatively short distance about the longitudinal axis of the drive shaft 134. A pair of helical springs bias the paper gripper slide 137 against the gripper arm 135 to firmly grasp the leader 35.

Referring again to FIG. 5, the drive shaft 134 is mounted in a pair of bearings 141 which bearings are attached to the inwardly facing surfaces of the frame halves 78 and 79. The end of the drive shaft 134 adjacent the frame half 79 is attached to a driven coupling 142. The frame halves 78 and 79 are maintained in spaced apart relationship in part by an exchange gripper pin 143 which is attached to and extends between the two frames. A second such pin is shown in FIG. 4 adjacent the locating pin/nut 95.

Figure 10:
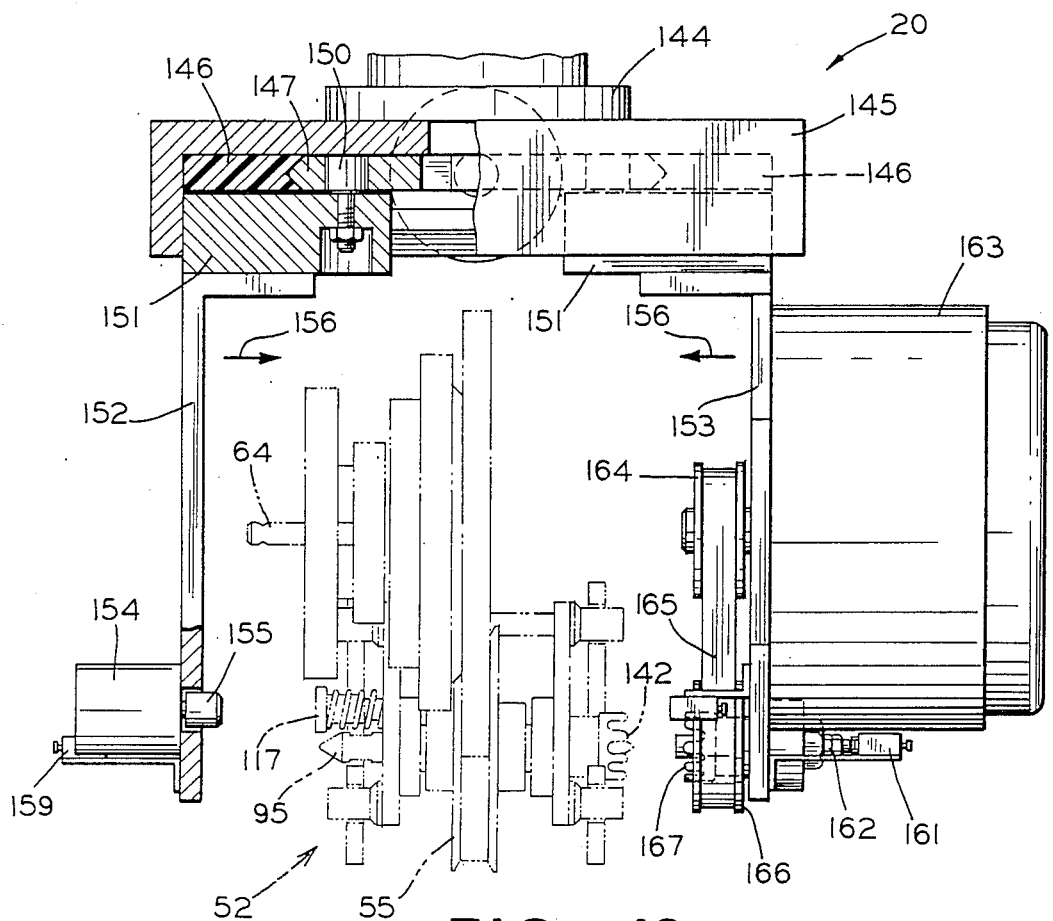
FIG. 10 is a front elevational view of the tape cartridge carrier of FIG. 1 with a portion thereof broken away.
Figure 11:
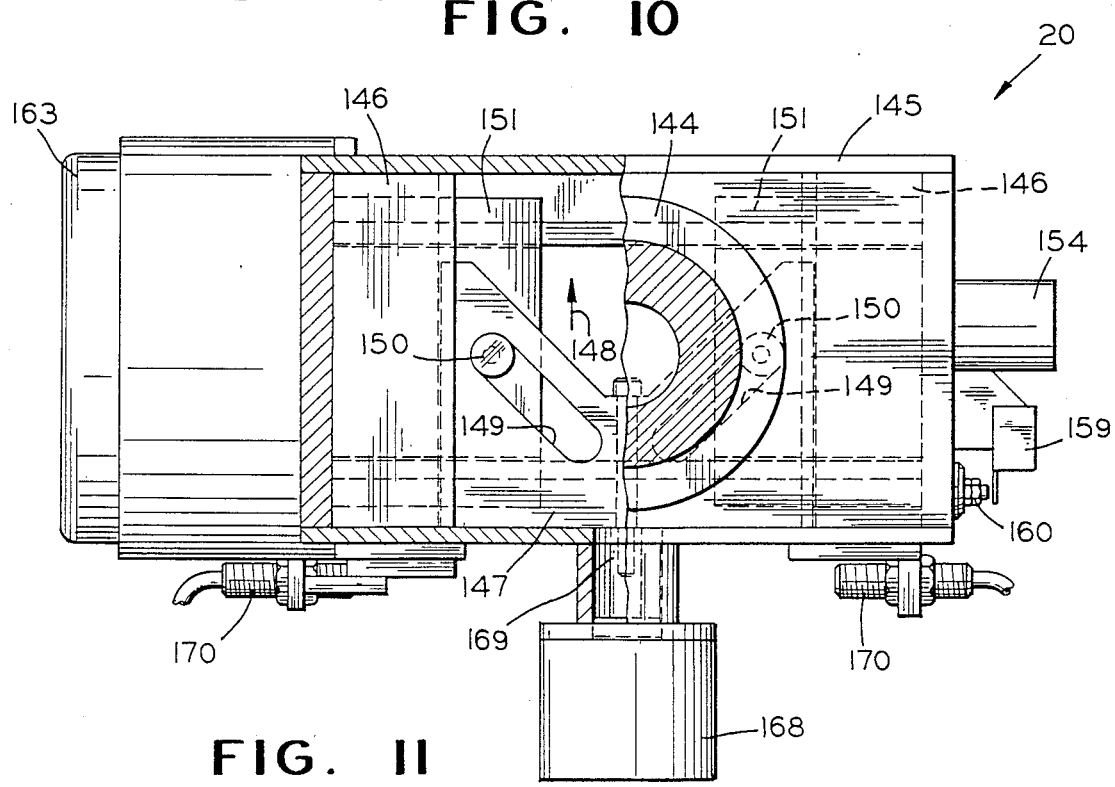
FIG. 11 is a top plan view of the tape cartridge carrier of FIG. 10 with a portion thereof broken away.
Figure 12:
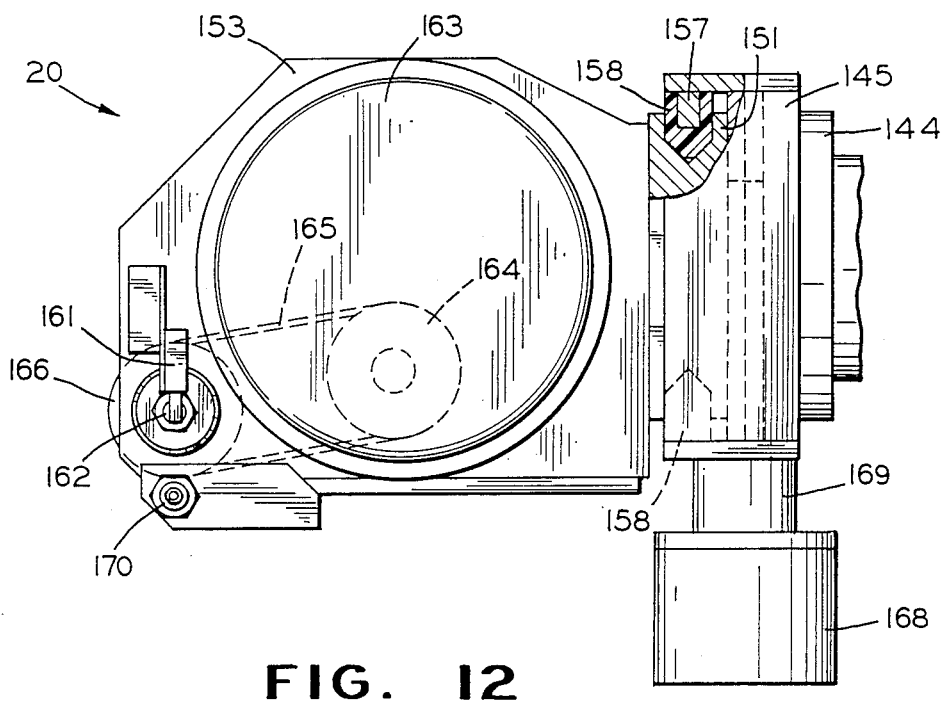
FIG. 12 is a side elevational view of the tape cartridge carrier of FIG. 10 with a portion thereof broken away.

There is shown in FIGS. 10 through 12, the tape cartridge carrier 20 with the tape cartridge 52 shown in phantom. The carrier 20 includes a robot adapter 144 for attachment to the robot arm 18 (FIG. 1). Mounted on the robot adapter 144 is a main housing 145 which is generally in the form of a box having an open bottom. Mounted on the inside surface of the top of the housing 145 are a pair of slide guides 146. A slide plate 147 is located between the two slide guides 146 and has opposed V-shaped edges which cooperate with V-shaped slots formed in the edges of the slide guides 146. Thus, the slide plate 147 can move from the position shown in FIG. 11 toward the front of the housing 145 in the direction of an arrow 148. A pair of slots 149 are formed in the slide plate 147 and each has a longitudinal axis which is angled with respect to the direction of the arrow 148. Each of the slots 149 retains a cam follower 150 which is attached to one of a pair of gripper slides 151. Thus, as the slide plate 147 is moved toward the front of the housing 145, the gripper slides 151 will be forced toward one another.

A right gripper arm 152 and a left gripper arm 153 are each attached to one of the gripper slides 151 and extend downwardly from the main housing 145. Mounted on an outer surface of the gripper arm 152 is a solenoid actuator 154 which can be powered by a suitable fluid or electricity. The output shaft of the actuator 154 extends through an aperture formed in the gripper arm 152 and terminates in a brake actuator tip 155. When the gripper arms 152 and 153 are moved toward one another in the direction of arrows 156, the brake actuator tip 155 will be in position to be moved against the rack spring cap 117 thereby moving the rack 115 and actuating the brake/foam grippers 107. Furthermore, the arm 152 will engage the ends of the guide pins 64 and 65 to provide a fixed surface on the tape roll gripper actuator 61 is actuated.

As best shown in FIG. 12, a slide guide support 157 is attached to the inner surface of the front wall of the main housing 145. The support 157 engages a slot formed in a slide guide 158 which has a generally V-shaped edge which cooperates with a generally V-shaped slot formed in the gripper slide 151. A similar set of slide guide support 157 and slide guide 158 are attached to the inside surface of the rear wall of the main housing 145.

Also attached to the right gripper arm 152, on its outer surface, is a microswitch 159 which cooperates with a microswitch actuator 160. The actuator 160 extends through the wall of the arm 152 and is engaged by one of the locating pin/nuts 95 on the cartridge 52. A similar microswitch 161 and micro switch actuator 162 are attached to the left gripper arm 153 to be actuated by the other one of the locating pin/nuts 95.

Also mounted on the arm 153, on its outer surface, is a gear motor 163 having an output shaft which extends through the arm 153 and is attached for driving a pulley 164. The drive pulley 164 drives a belt 165 which engages a timing pulley 166. Attached to the timing pulley 166 for rotation therewith is a driving coupling 167 which engages the driven coupling 142 to rotate the paper wrap-up wheel 55 on the tape cartridge 52.

An actuating cylinder 168 is mounted on the outside surface of a rear wall of the main housing 145. The cylinder 168 is coupled to a cylinder adapter 169 which in turn is attached to the slide plate 147. Thus, when the cylinder 168 is actuated to extend the cylinder adapter 169 in the direction of the arrow 148, the slide plate 147 is moved also in the direction of the arrow 148 and the gripper slides 151 are moved toward one another to force the gripper arms 152 and 153 toward one another. When the locating pin/nuts 95 engage the microswitch actuators 160 and 162 and the microswitches 159 and 161 are actuated, the actuating cylinder 168 is signaled to stop its advance. Thus, the tape cartridge 52 is now firmly gripped by the tape cartridge carrier 20. A pair of photocells 170 can be attached to the rear edges of the gripper arms 152 and 153 for detecting the presence of one of the cartridges 52 to insure that the apparatus is operating properly.

Figure 13:
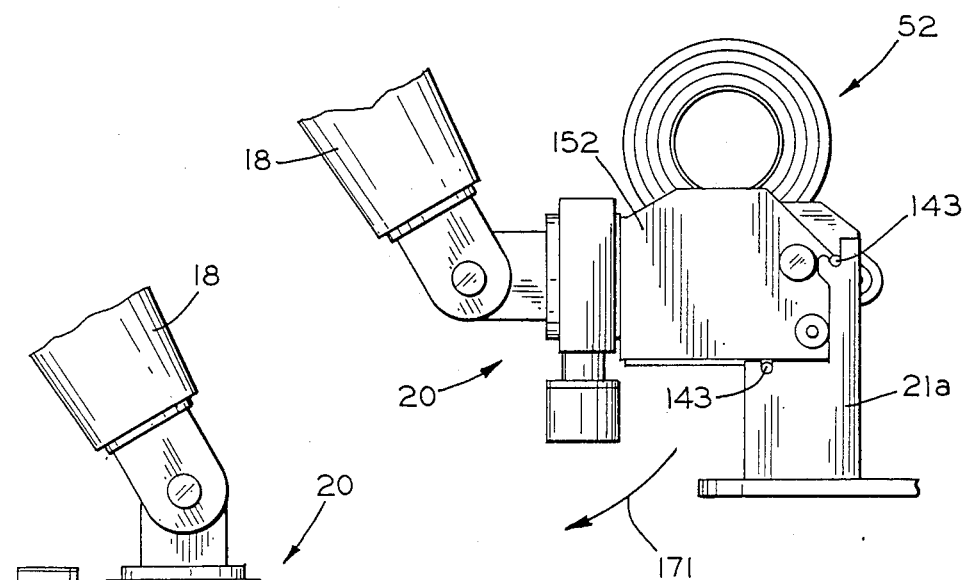
FIG. 13 is a fragmentary elevational view of the robot arm, tape cartridge carrier and tape cartridge of FIG. 1 in the engage/disengage position.
Figure 14:
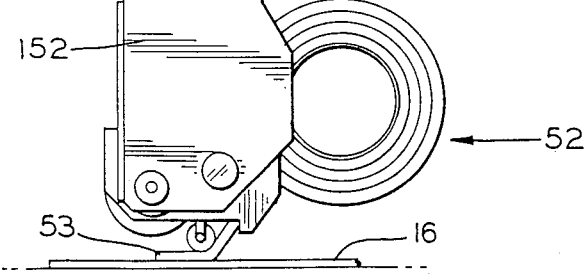
FIG. 14 is an elevational view of a portion of the robot arm, tape cartridge carrier and tape cartridge in the tape application position.

There is shown in FIG. 13 the robot arm 18 and tape cartridge carrier 20 in position to remove a loaded tape cartridge 52 from one of the tape cartridge holders 21a. It can be seen that the exchange gripper pins 143 on the tape cartridge 52 engage small grooves in the holder 21a to support the tape cartridge 52 until the gripper arms 152 and 153 engage the tape cartridge. After the tape cartridge 52 has been lifted from the holder 21a, the tape cartridge carrier 20 is rotated in the direction of an arrow 171 approximately ninety degrees to the tape application position whereby the strip of tape 53 can be applied to the upwardly facing surface of the workpiece 16.

In accordance with the provisions of the patent statues, the present invention has been described in what is considered to represent its preferred embodiment. However, it should be noted that the invention can be practiced otherwise than as specifically illustrated and described without departing from its spirit or scope.

What is claimed is:

1. A method of applying a double sided adhesively coated strip of material to a window assembly comprising the steps of:
    a. winding a predetermined length of double sided adhesively coated strip material about a core to form a spiral assembly;
    b. placing said spiral assembly in a dispensing cartridge at a loading station;
    c. loading said dispensing cartridge into a gripper assembly coupled to an end of a robot arm;
    d. controlling said robot arm to position said dispensing cartridge and an outer end of said strip material adjacent a surface of a window assembly;
    e. moving said robot arm to guide said dispensing cartridge along a predetermined path to adhere said strip material to the window assembly; and
    f. controlling said robot arm to return said dispensing cartridge to said loading station and release said dispensing cartridge from said gripper assembly.

2. The method according to claim 1 wherein step a. includes applying a backing paper to one side of said strip material before said winding to form a spiral assembly.

3. The method according to claim 2 wherein step e. includes removing said backing paper from said spiral assembly.

4. The method according to claim 1 including the step of positioning said window assembly on a fixture prior to performing step d.

5. The method according to claim 4 including wiping a surface of said window assembly with a primer material after said window assembly is positioned on said fixture.

6. The method according to claim 1 including performing the step of trimming at least one of the ends of said strip material after step e.

7. The method according to claim 1 including performing the step of applying a sealant to the ends of said strip material after step e.

8. The method according to step 1 including applying a piece of stripping paper to said strip material after said step e.

9. A method of applying an adhesively coated strip of material to a window assembly comprising the steps of:
 a. spiral winding a predetermined length of adhesively coated strip material and loading the strip material into a dispensing cartridge at a loading station;
 b. moving said dispensing cartridge to a gripper station;
 c. engaging said dispensing cartridge with a gripper assembly coupled to a robot arm;
 d. moving said robot arm to position said dispensing cartridge with an end of said strip material on a surface of a window assembly;
 e. moving said robot arm to guide said dispensing cartridge along a predetermined path to adhere said strip material to said window assembly; and
 f. moving said robot arm to return said dispensing cartridge to said gripper station and disengaging said gripper assembly to release said dispensing cartridge.

10. An apparatus for applying a gasket to an object, the gasket including a strip of foam having opposed adhesive bearing surfaces and a strip of paper tape adhered to one of the surfaces, the foam and the paper tape being wound on a hollow core, comprising:
 means for selectively gripping a hollow core upon which a gasket is wound;
 a paper wrap-up wheel for accumulating a paper tape strip as it is removed from a strip of foam in the gasket;
 a frame for rotatably mounting said means for selectively gripping and said paper wrap-up wheel; and
 a pair of spaced apart seal guide wheels attached to said frame and adapted to engage a surface of an object to define a path for the strip of foam as the strip of foam is applied to the surface of the object.

11. The apparatus according to claim 10 wherein said means for selectively gripping includes a plurality of gripper dogs rotatably mounted on said frame and a gripper actuator connected to said dogs and attached to said frame for movement along a path parallel to an axis of the core for selectively engaging and disengaging said gripper dogs with the core.

12. The apparatus according to claim 11 wherein said means for selectively gripping includes a mounting bracket having an aperture formed therein for slidably retaining said gripper actuator, a pair of guide pins attached to said mounting bracket and extending through apertures formed in said gripper actuator, and detent means for retaining said gripper actuator in at least two spaced apart positions along said guide pins.

13. The apparatus according to claim 10 wherein said paper wrap-up wheel is mounted on a drive shaft rotatably supported by said frame and has a driven coupling attached to one end of said drive shaft and adapted to engage a driving coupling for rotating said paper wrap-up wheel to accumulate the strip of paper.

14. The apparatus according to claim 10 wherein said paper wrap-up wheel includes means for gripping and retaining an end of the paper tape.

15. The apparatus according to claim 14 wherein said means for gripping and retaining includes a gripper arm mounted for rotation about an axis of said paper take-up wheel and a gripper slide positioned adjacent an end of said gripper arm whereby in one position of said gripper arm, an end of the paper tape can be retained between said gripper arm and said gripper slide.

16. The apparatus according to claim 15 wherein said gripper slide is mounted for limited movement along an arcuate path and including means for biasing said gripper slide toward said gripper arm.

17. The apparatus according to claim 15 including means for selectively rotating said gripper arm into and out of engagement with said gripper slide.

18. The apparatus according to claim 10 including a pressure wheel rotatably mounted on said frame for forcing the gasket against the object when said seal guide wheels engage the surface of the object.

19. The apparatus according to claim 18 including brake means for selectively preventing the rotation of said pressure wheel.

20. The apparatus according to claim 10 including a carrier means adapted to be attached to an end of a robot arm and including means for rotating said paper wrap-up wheel.

21. The apparatus according to claim 20 wherein said paper wrap-up wheel is mounted on a drive shaft rotatably attached to said frame and a driven coupling is attached to said drive shaft and wherein said means for driving includes a gear motor connected to a driving coupling for engaging said driven coupling.

22. An apparatus for applying a gasket to an object, the gasket being wound on a core retained in a cartridge, comprising:
 a housing;
 a pair of spaced apart opposed gripper arms slidably mounted on said housing;
 means for selectively moving said arms into and out of engagement with a cartridge retaining a gasket; and
 means for unwinding the gasket from the cartridge.

23. The apparatus according to claim 22 wherein said housing includes a pair of slide guides, a slide plate engaging said slide guides for slidable movement in a first direction with respect to said slide guides, a second pair of slide guides attached to said housing, and a pair of gripper slides mounted for slidable movement along a second direction with respect to said second set of slide plates and connected to said slide plate and wherein said pair of gripper arms are attached to said gripper slides whereby movement of said slide plate in said first direction moves said gripper slides and said gripper arms in said second direction.

24. The apparatus according to claim 22 wherein said means for selectively moving said arms includes an actuating cylinder and cylinder adapter connected to said pair of gripper arms.

25. The apparatus according to claim 22 including means for sensing the presence of a cartridge between said pair of gripper arms.

26. The apparatus according to claim 22 including means for engaging a cartridge and for controlling said means for selectively moving said arms for stopping the movement of said arms when the arms have engage the cartridge.

27. An apparatus for applying a gasket to an object, the gasket including a strip of foam having opposed adhesive bearing surfaces and a strip of paper tape adhered to one of the surfaces, the foam and the paper tape being wound on a hollow core, comprising:

a cartridge frame;

means for selectively gripping a hollow core upon which a gasket is wound rotatably attached to said frame;

a paper wrap-up wheel for accumulating a paper tape strip as it is unwound from a gasket rotatably attached to said frame;

a driven coupling attached to said paper wrap-up wheel;

a carrier housing;

a pair of spaced apart opposed gripper arms slidable attached to said housing;

means for selectively moving said arms toward one another;

means for sensing engagement of said arms with said cartridge frame and disabling said means for selectively moving; and means attached to at least one of said arms for engaging said driven coupling and rotating said paper wrap-up wheel to unwind the gasket from the core.

* * * * *